United States Patent
Kruglick et al.

(10) Patent No.: US 8,802,303 B2
(45) Date of Patent: *Aug. 12, 2014

(54) METAL AIR BATTERY INCLUDING A COMPOSITE ANODE

(71) Applicant: Empire Technology Development LLC, Wilmington, DE (US)

(72) Inventors: Ezekiel Kruglick, Poway, CA (US); Thomas Yager, Encinitas, CA (US); Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/055,445

(22) Filed: Oct. 16, 2013

(65) Prior Publication Data

US 2014/0045100 A1   Feb. 13, 2014

Related U.S. Application Data

(62) Division of application No. 12/999,694, filed as application No. PCT/US2010/050973 on Sep. 30, 2010, now Pat. No. 8,617,750.

(51) Int. Cl.
*H01M 8/22* (2006.01)

(52) U.S. Cl.
USPC .......... 429/402; 429/405; 429/532; 427/58; 427/123; 427/125

(58) Field of Classification Search
CPC ......... H01M 12/08; H01M 4/86; H01M 4/88; H01M 8/04; B05D 5/00; Y02E 60/50; Y02E 60/128
USPC ........... 429/532, 137, 402, 405; 427/58, 123, 427/125
See application file for complete search history.

(56) References Cited

U.S. PATENT DOCUMENTS 4,091,174 A   5/1978   Ruch
4,414,293 A   11/1983   Joy (Continued)

OTHER PUBLICATIONS

Arthur Dobley, Joseph Dicarlo and K. M. Abraham, Non-aqueous Lithium-Air Batteries with an Advanced Cathode Structure, in Proceedings of 41st Power Sources Conference, Philadelphia, PA, 2004, as accessed on Dec. 13, 2010 at http://www.yardney.com/Lithion/Documents/PaprAD-JD-KMA.pdf.

(Continued)

*Primary Examiner* — Milton I Cano
*Assistant Examiner* — Ling R Zeng

(57) ABSTRACT

Implementations and techniques for metal air batteries including a composite anode are generally disclosed.

18 Claims, 6 Drawing Sheets

(56) References Cited

U.S. PATENT DOCUMENTS

| | | | |
|---|---|---|---|
| 4,427,502 A | 1/1984 | Abys | |
| 4,801,511 A | 1/1989 | Young | |
| 4,859,298 A | 8/1989 | Senge et al. | |
| 4,968,389 A | 11/1990 | Satoh et al. | |
| 4,981,672 A | 1/1991 | De Neufville et al. | |
| 5,558,947 A | 9/1996 | Robison | |
| 5,849,427 A | 12/1998 | Siu et al. | |
| 6,355,369 B1 * | 3/2002 | Iarochenko et al. | 429/404 |
| 6,811,918 B2 | 11/2004 | Blunk et al. | |
| 2005/0045491 A1 * | 3/2005 | Zhu et al. | 205/676 |
| 2005/0045494 A1 | 3/2005 | Huang et al. | |
| 2005/0147857 A1 | 7/2005 | Crumm et al. | |
| 2007/0068819 A1 | 3/2007 | Singh et al. | |
| 2007/0117007 A1 | 5/2007 | Visco | |
| 2009/0169996 A1 | 7/2009 | Zhamu et al. | |
| 2010/0124675 A1 * | 5/2010 | Bradley et al. | 429/12 |
| 2011/0091768 A1 | 4/2011 | Ohashi et al. | |

OTHER PUBLICATIONS

Xin Zhang, Shag Hua Yang and Harold Knickle, Novel operation and control of an electric vehicle aluminum/air battery system, Journal of Power Sources 128 (2004), pp. 331-342.

Wikipedia, "Aluminium—air battery," accessed at http://en.wikipedia.org/wiki/Aluminium_battery, last modified on Mar. 5, 2012, 3 pages.

International Search Report and Written Opinion for International Application No. PCT/US2010/050973 mailed on Nov. 12, 2010.

* cited by examiner

METAL AIR BATTERY INCLUDING A COMPOSITE ANODE

CROSS-REFERENCE TO RELATED APPLICATIONS

This application is a divisional application of U.S. patent application Ser. No. 12/999,694, now U.S. Pat. No. 8,617,750, filed Dec. 17, 2010, and titled "Metal Air Battery Including a Composite Anode" which is a 371 national stage entry of International Application No. PCT/US10/50973, filed on Sep. 30, 2010 both of which are incorporated herein by reference in their entireties.

BACKGROUND

Metal air batteries are typically based on highly reactive substances and may have problems with corrosion during storage. For example, aluminum air batteries may be typically kept sitting without electrolyte because the electrolyte may corrode the aluminum during inactive periods. Emergency light aluminum air batteries, for example, may keep the electrolyte in a separate tank and release the electrolyte into the battery when operation is needed. Automotive aluminum air batteries may have complex systems to pump and time electrolyte introduction into the battery. Lithium batteries may have similar problems with aqueous electrolytes and thus may use polymer-type electrolytes.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

This disclosure is drawn, inter alia, to methods, apparatus, and systems related to metal air batteries including a composite anode.

Some example apparatus related to metal air batteries may include a cathode, a composite anode, a battery housing, and an electrolyte. The composite anode may include an anode core and a corrosion resistant coating coupled to a surface of the anode core. The anode core may include a first metal and the corrosion resistant coating may include a second metal that is different from the first metal. The electrolyte may be stored in the battery housing in contact with the cathode and the composite anode. In some examples, the metal air battery may include a deplating electrode that may be capable of at least partially electropolishing the corrosion resistant coating from the composite anode. Additionally or alternatively, in some examples, the cathode may be capable of at least partially electropolishing the corrosion resistant coating from the composite anode. Additionally or alternatively, in some examples, the electrolyte may be configured to precipitate the corrosion resistant coating during electropolishing operations.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

Figure 1:
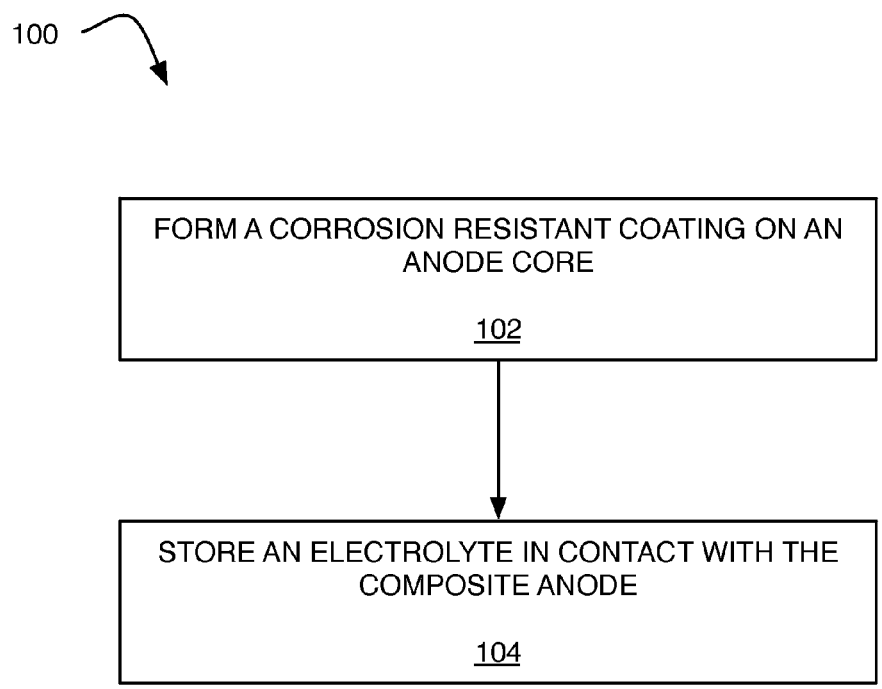
FIG. 1 is an illustration of an example process to produce a metal air battery.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to metal air batteries including a composite anode.

Metal air batteries may have anode corrosion during storage if the anode is in contact with electrolyte. To deal with this limitation, the anodes may be kept separate from the electrolyte during inactive storage periods. Aluminum air batteries for emergency lights, for example, may keep the electrolyte in a separate tank and release it into the battery when operation is needed. Other types of metal air batteries (i.e., those used for automotive applications) may have pump systems capable of controlling the flow of the electrolyte to the anode. This pumping system may increase the complexity of the battery and may reduce the energy density of the battery.

As will be discussed in greater detail below, metal air batteries may include a composite anode that includes an anode core of a first metal coated with a corrosion resistant coating of a second metal. Such a composite anode may be stored together with an electrolyte, as the corrosion resistant coating may not chemically react with the electrolyte during storage of the metal air battery. In operation, the corrosion resistant coating may be removed via electropolishing within the battery prior to discharge of the metal air battery. Accordingly, the corrosion resistant coating may be removed from the anode core when the battery is no longer being stored in preparation for discharge of the metal air battery.

FIG. 1 is an illustration of an example process 100 to produce a metal air battery that is arranged in accordance with at least some embodiments of the present disclosure. In the illustrated example, process 100, and other processes described herein, set forth various functional blocks or actions that may be described as processing steps, functional operations, events and/or acts, etc. Those skilled in the art in light of the present disclosure will recognize that numerous alternatives to the functional blocks shown in FIG. 1 may be practiced in various implementations. For example, although process 100, as shown in FIG. 1, comprises one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more of operations as illustrated by blocks 102 and/or 104.

As illustrated, process 100 may be implemented to produce a metal air battery. Processing may begin at operation 102, "form a corrosion resistant coating on an anode core", where a corrosion resistant coating may be formed on a surface of an anode core to form a composite anode. For example, the anode core may include a first metal and the corrosion resistant coating may include a second metal that is different from the first metal. A used herein the term "corrosion resistant coating" may refer to corrosion resistant coating that is non-reactive (or less-reactive as compared with the anode core) with respect to an electrolyte stored in contact with the composite anode in a metal air battery. In one example, during storage of the metal air battery, the corrosion resistant coating associated with the composite anode may not chemically react with the electrolyte. As used herein the term "not chemically react" and the like may refer to the corrosion resistant coating being minimally reactive with respect to an electrolyte so as to not detrimentally impact the composite anode, reacting at a very slow rate, or reacting in a self-terminating fashion.

The corrosion resistant coating may be applied to any shape of anode core using any number of combinations of immersion, electroless plating, electroplating, and/or other deposition processes. Depending on the material selected for the second metal, the second metal may be applied to have a thickness from about 2.0 µm to about 50.0 µm, or more particularly, may have a thickness from about 2.0 µm to about 25.0 µm, although thicknesses above or below this range may be appropriate depending on the materials or particular implementation.

In some examples, the first metal associated with the anode core may include one or more of aluminum, magnesium, lithium, zinc, iron, or the like. In some examples, the second metal associated with the corrosion resistant coating may include one or more of nickel, platinum, copper, zinc, or the like. In one example, the first metal associated with the anode core may include aluminum and the corrosion resistant coating may include nickel, although other metal combinations are contemplated. In this example, nickel and/or nickel alloy may have an increased corrosion resistance in the electrolyte (as compared with aluminum). In another example, the first metal associated with the anode core may include aluminum and the corrosion resistant coating may include zinc, although other metal combinations are contemplated. In this example, zinc and/or zinc alloy may have an increased corrosion resistance in the electrolyte (as compared with aluminum).

Processing may continue from operation 102 to operation 104, "store an electrolyte in contact with the composite anode", where an electrolyte may be stored in contact with the composite anode. For example, the electrolyte may include an alkaline electrolyte (e.g., potassium hydroxide); a metal salt of the first metal (e.g., magnesium perchlorate); organic electrolytes; solid electrolytes (e.g., Lithium Super Ionic Conductor); the like, or combinations thereof. Such an electrolyte may be devoid of additives (or have reduced levels of additives) that might be typically utilized to inhibit corrosion of the first metal associated with the anode core.

In one example, during storage of the metal air battery, the corrosion resistant coating associated with the composite anode may not chemically react with the electrolyte. Conversely, prior to discharge of the metal air battery, the corrosion resistant coating may be capable of being removed from the surface of the anode core. Accordingly, in operation, the corrosion resistant coating may be removed from the surface of the anode core prior to discharge of the metal air battery. Additional details regarding example implementations for removing the corrosion resistant coating from the surface of the anode core may be found below in the discussion of FIG. 2.

Figure 2:
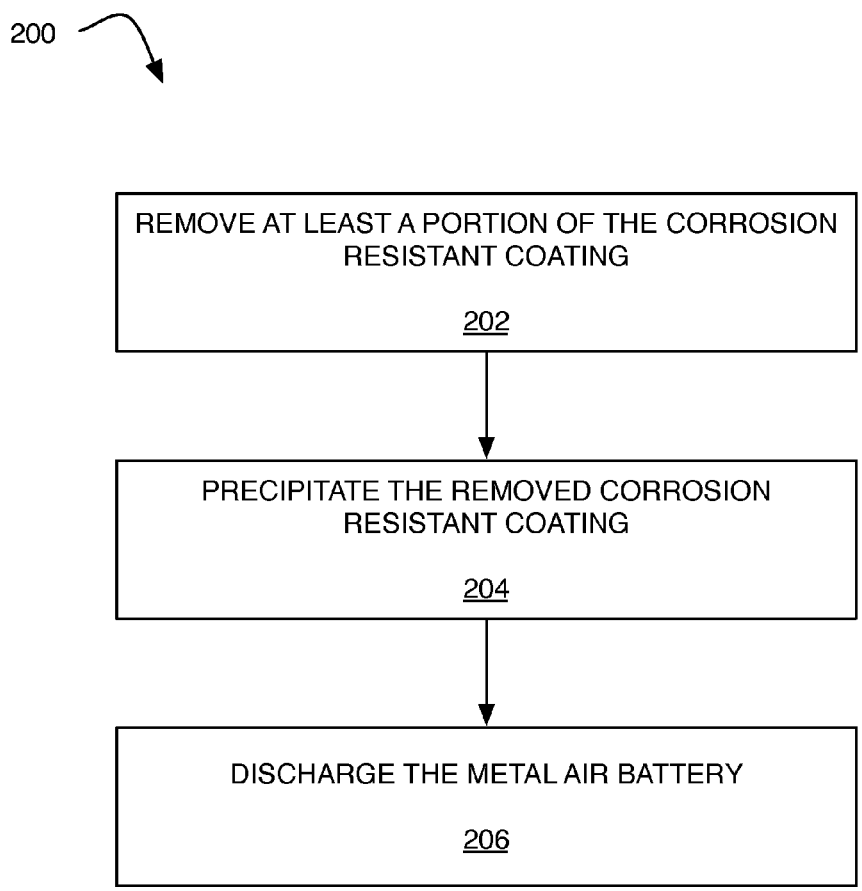
FIG. 2 is an illustration of an example process of operation of a metal air battery.

FIG. 2 illustrates an example of operation of a metal air battery that is arranged in accordance with at least some embodiments of the present disclosure. Process 200 may include one or more of operations as illustrated by blocks 202, 204, and/or 206.

As illustrated, process 200 may be implemented during operation of a metal air battery. Processing may begin at operation 202, "remove at least a portion of the corrosion resistant coating", where at least a portion of the corrosion resistant coating may be removed from the surface of the anode core. For example, the composite anode may be electropolished to remove at least a portion of the corrosion resistant coating to expose a surface of the anode core portion of the composite anode.

In some examples, removal of the corrosion resistant coating may be performed in two or more stages so that an initial portion of the corrosion resistant coating could be removed during initial operation and one or more subsequent portions could be removed during subsequent operation, e.g., as might be utilized in long life-type batteries. For example, an individual composite anode may have the corrosion resistant coating removed in two or more stages. Additionally or alternatively, one or more composite anodes from an array of composite anodes might be selectively deplated on an anode-by-anode basis in two or more stages.

In some examples, a cathode of the metal air battery may be capable of at least partially electropolishing the corrosion resistant coating from the composite anode. Additionally or alternatively, as will be described in greater detail below, the metal air battery may include a deplating electrode (i.e., an electrode in addition to the composite anode and the cathode) that may be capable of at least partially electropolishing the corrosion resistant coating from the composite anode.

Processing may continue from operation 202 to operation 204, "precipitate the removed corrosion resistant coating", where the removed corrosion resistant coating may be precipitated out of the electrolyte. For example, the removed portions of corrosion resistant coating may be precipitated out of the electrolyte to prevent collection of corrosion resistant coating on the cathode. Additionally or alternatively, the removed portions of corrosion resistant coating may be bonded with a passive third solid on the battery housing (and/or tank holding the electrolyte) to prevent collection of corrosion resistant coating on the cathode. A crosslinked polyanion material might be utilized as a passive third solid, such as a highly porous block of poly(styrene sulfonate), for example.

In some examples, the electrolyte may include a precipitation substance. For example, such a precipitation substance may be utilized to precipitate corrosion resistant coating out of the electrolyte during removal of the corrosion resistant coating from the surface of the anode. For example, such a precipitation substance may include a substance that is at least dianionic at the solution pH, such as ascorbic acid, succinic acid, citric acid, or the like, configured to precipitate the corrosion resistant coating during electropolishing of the composite anode. The electrolyte may be selected and/or modified to be suitable for both electropolishing the corrosion resistant coating and discharging of the battery. For example, the second metal of the corrosion resistant coating of a platinum-type may be generally plated off in an electrolyte having a pH range from about 7.5 to about 13, whereas aluminum anodes may be generally discharged in an electrolyte having a pH 1 range from about 10 to about 13.

Additionally or alternatively, as will be described in greater detail below, in examples including a deplating electrode (i.e., an electrode in addition to the composite anode and the cathode), the removed portions of corrosion resistant coating may be collected on the deplating electrode. For example, the removed portions of corrosion resistant coating may be collected on the deplating electrode to prevent collection of corrosion resistant coating on the cathode. In such an example, discharging of the metal air battery may be conducted via the cathode interacting with the composite anode while electropolishing may be conducted via the deplating electrode interacting with the composite anode.

Processing may continue from operation 204 to operation 206, "discharge the metal air battery", where the metal air battery may be discharged. For example, the discharging of the metal air battery may be conducted via the cathode interacting with the composite anode via the exposed surface of the anode core.

Figure 3:
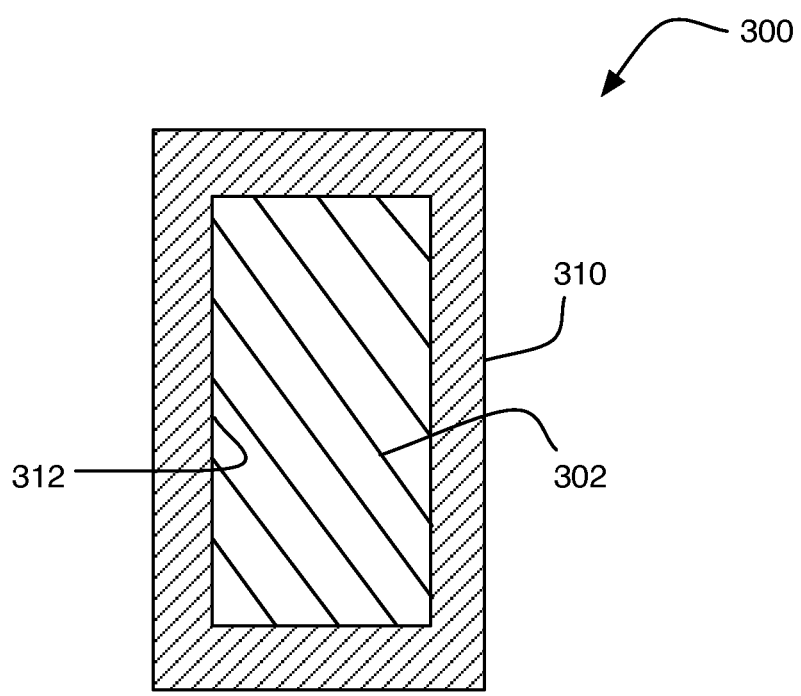
FIG. 3 is an illustration of an example cross-sectional side view of a portion of a composite anode at a given stage of processing.

FIG. 3 is an illustration of an example cross-sectional side view of a portion of a composite anode 300 at a given stage of processing, in accordance with at least some embodiments of the present disclosure. FIG. 3 is provided for purposes of illustration and is not intended to depict structures having exact dimensionalities, shapes etc. nor to depict all components or structures that may be present in some implementations but that have been excluded from FIG. 3 to avoid unnecessarily obscuring claimed subject matter.

As illustrated, composite anode 300 may include an anode core 302. Anode core 302 may be of any shape, such as a rectangular-type plate form, a wedged-type plate form, or the like, for example. Other shapes may be used, such as pellets for a mechanically rechargeable battery, for example. Anode core 302 may include a first metal. In some examples, the first metal associated with anode core 302 may include one or more of aluminum, magnesium, lithium, zinc, iron, or the like. In one example, the first metal associated with the anode core may include aluminum. In this example, anode core 302 may include aluminum without being alloyed with additives such as tin and/or other metals, for example. Additives, such as tin, may increase the internal resistance of a battery by causing the electrolyte to gel during use, and/or may make recycling of the battery more complex. However, in some examples, additives, such as tin, may still be used in addition to a corrosion resistant coating 310 in some situations, such as very slow discharge batteries that might still benefit from including corrosion resistant coating 310 in addition to such additives.

As illustrated, a corrosion resistant coating 310 may be formed on a surface 312 of anode core 302. Corrosion resistant coating 310 may be applied to any suitable shape of anode core 302 using any number of combinations of immersion, electroless plating, electroplating, and/or other deposition processes. Depending on the material selected for the second metal, the second metal may be applied to have a thickness from about 2.0 μm to about 50.0 μm, or more particularly, may have a thickness from about 2.0 μm to about 25.0 μm, although thicknesses outside this range may be appropriate depending on the materials or particular implementation.

Corrosion resistant coating 310 may include a second metal that may be different from the first metal associated with anode core 302. In some examples, the second metal associated with the corrosion resistant coating may include one or more of nickel, platinum, copper, zinc, or the like. In one example, the second metal associated with the corrosion resistant coating may include nickel. In this example, nickel and/or nickel alloy may have an increased corrosion resistance in the electrolyte (i.e., as compared with aluminum). For example, corrosion resistant coating 310 may be applied as a coating of nickel and/or nickel alloy formed on surface 312 of anode core 302 via electroplating (or other suitable technique) to a thickness of about 25.0 μm, without diffusing nickel and/or nickel alloy into anode core 302.

Figure 4:
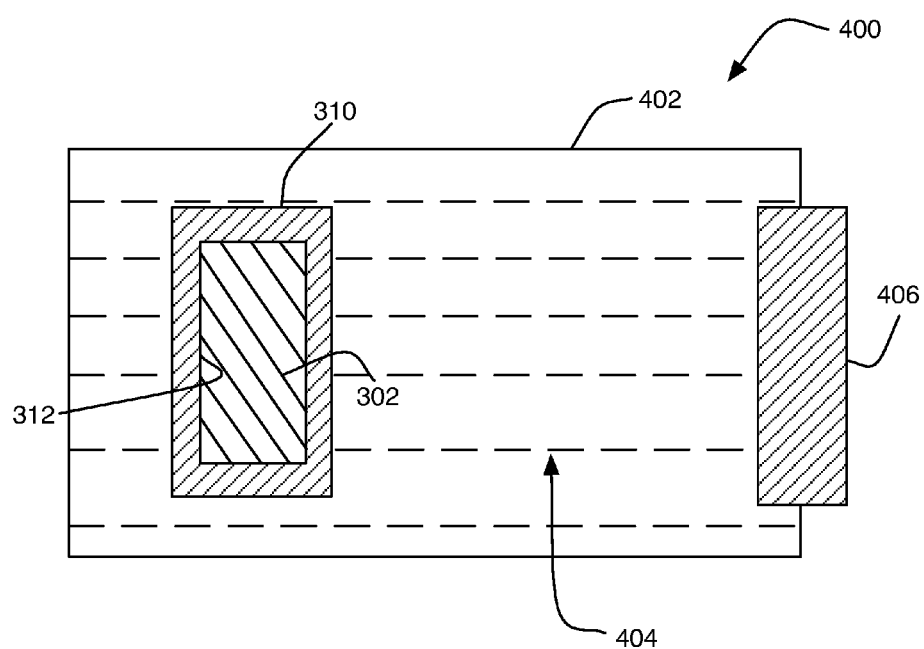
FIG. 4 is an illustration of an example battery.

FIG. 4 is an illustration of an example metal air battery 400, in accordance with at least some embodiments of the present disclosure. FIG. 4 is provided for purposes of illustration and is not intended to depict structures having exact dimensionalities, shapes etc. nor to depict all components or structures that may be present in some implementations but that have been excluded from FIG. 4 to avoid unnecessarily obscuring claimed subject matter.

As illustrated, metal air battery 400 may include composite anode 300. As described above, composite anode 300 may include corrosion resistant coating 310 including a second metal coupled to surface 312 of anode core 302 including a first metal that may be different from the second metal.

A battery housing 402 may contain composite anode 300. An electrolyte 404 may be stored in battery housing 402 so as to be in contact with composite anode 300. An air cathode 406 may be stored in battery housing 402 so as to be in contact with electrolyte 404. For example, cathode 406 may include a metallic screen coated or impregnated with a catalyst such as silver, platinum, platinum-ruthenium, spinel, perovskites, iron, nickel, or the like.

Corrosion resistant coating 310 may not chemically react with electrolyte 404 during storage of metal air battery 400. In operation, corrosion resistant coating 310 may be capable of being at least partially electropolished from composite anode 300 via cathode 406. For example, cathode 406 may be configured to at least partially electropolish corrosion resistant coating 310 from composite anode 300 as well as being configured to discharge a charge from metal air battery 400. Electrolyte 404 may be configured to precipitate the removed portion of corrosion resistant coating 310 during such electropolishing. In other applications the protective coating might form a solid in the electrolyte solution. For example, a copper-type corrosion resistant coating 310 may quickly drop out of solution as copper hydroxide so as to not affect cathode 406. After at least partially electropolishing corrosion resistant coating 310, metal air battery 400 may be discharged. For example, the discharging of metal air battery 400 may be conducted via cathode 406 interacting with composite anode 300 via an exposed portion of surface 312 of anode core 302. Additional portions of anode core 302 and/or other anode cores (not shown) may be subsequently electropolished and subsequently discharged.

For example, the primary fuel for metal air battery 400 may be the first metal associated with anode core 302. The second metal associated with corrosion resistant coating 310 may operate to prevent and/or limit corrosion to anode core 302. For example, the second metal associated with corrosion resistant coating 310 may be more resistant to corrosion than the first metal associated with anode core 302, and may protect anode core 302 from corrosion during storage. When corrosion resistant coating 310 is at least partially electropolished from composite anode 300, revealing at least a portion of the more reactive first metal associated with anode core 302, anode core may be consumed as fuel. Accordingly, metal air battery 400 may not include a storage tank capable of storing electrolyte 404 separate from composite anode 300. Similarly, metal air battery 400 may not include a pump system capable of controlling the flow of electrolyte 404 to composite anode 300.

The resulting metal air battery 400 may have a variety of shapes. For example, battery 400 may be oriented and arranged so as to be suitable for various products such as portable electronics (i.e., cell phones, portable computers, cameras, personal digital assistants, etc.), hearing aids, emergency back-up systems, mobile soldier applications, military applications, aerospace applications, and/or the like.

Other components of battery 400 are contemplated, but not illustrated here. For example, battery 400 may include air access apertures in housing 402, an anode can adapted to house composite anode 300 within housing 402, a separator fabric saturated with electrolyte, a cathode can adapted to house cathode 406 within housing 402, a hydrophobic layer adapted to prevent moisture from entering battery 400 and flooding cathode 406, one or more air distribution membranes and/or air diffusion layers, and/or the like. Those skilled in the art in light of the present disclosure will recognize that numerous alternative components may be utilized in various implementations. For example, some of the components listed above may be eliminated or replaced with alternative components. Likewise, additional components not explicitly listed above may be employed, without departing from the scope of claimed subject matter.

Figure 5:
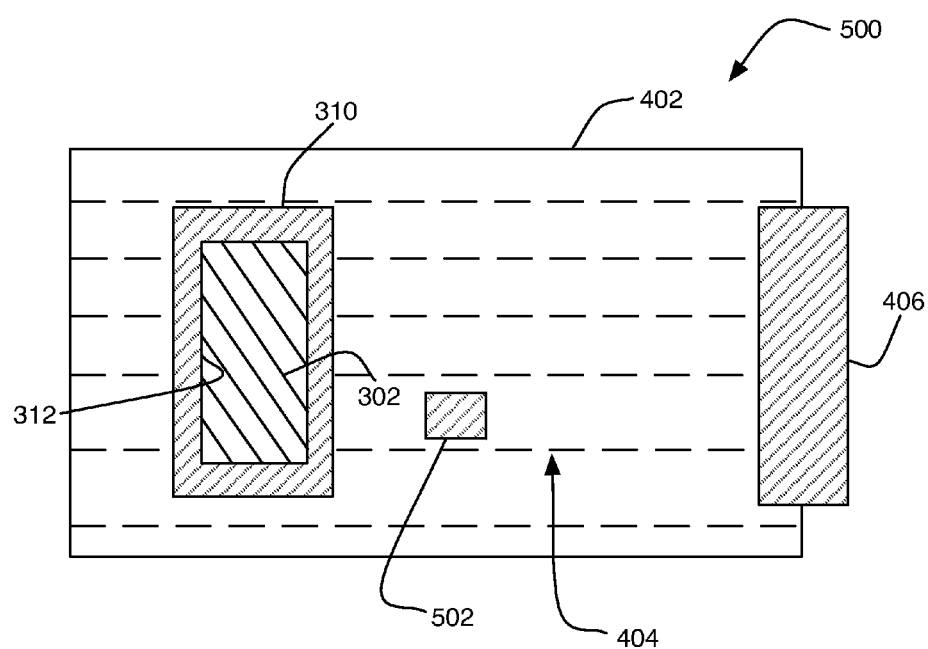
FIG. 5 is an illustration of another example battery.

FIG. 5 is an illustration of another metal air battery 500, in accordance with at least some embodiments of the present disclosure. FIG. 5 is provided for purposes of illustration and is not intended to depict structures having exact dimensionalities, shapes etc. nor to depict all components or structures that may be present in some implementations but that have been excluded from FIG. 5 to avoid unnecessarily obscuring claimed subject matter.

As illustrated, metal air battery 500 may include a deplating electrode 502. Deplating electrode 502 may be distinguishable from composite anode 300 and cathode 406 (i.e., an electrode in addition to the composite anode and the cathode). As illustrated, deplating electrode 502 may be positioned adjacent to and electrically isolated from composite anode 300.

Deplating electrode 502 may be capable of at least partially electropolishing the corrosion resistant coating from the composite anode. In examples including deplating electrode 502, the removed portions of corrosion resistant coating 310 may be collected on deplating electrode 502. For example, the removed portions of corrosion resistant coating 310 may be collected on deplating electrode 502 to prevent collection of corrosion resistant coating 310 on cathode 406. In such an example, discharging of metal air battery 500 may be conducted via cathode 406 interacting with composite anode 300 while electropolishing may be conducted via deplating electrode 502 interacting with composite anode 300.

The resulting metal air battery 500 may have a variety of shapes. For example, battery 500 may be oriented and arranges so as to be suitable for various products such as portable electronics (i.e., cell phones, portable computers, cameras, personal digital assistants, etc.), hearing aids, emergency back-up systems, mobile soldier applications, military applications, aerospace applications, and/or the like. After an initial use, metal air battery 500 may not be stored for extended periods of time without corrosion occurring at anode core 302. However, this may not be an issue for products such as portable electronics (i.e., cell phones, portable computers, cameras, personal digital assistants, etc.), hearing aids, emergency back-up systems, mobile soldier applications, military applications, aerospace applications, and/or the like.

Other components of battery 500 are contemplated, but not illustrated here. For example, battery 500 may include air access apertures in housing 402, an anode can adapted to house composite anode 300 within housing 402, a separator fabric saturated with electrolyte, a cathode can adapted to house cathode 406 within housing 402, a hydrophobic layer adapted to prevent moisture from entering battery 500 and flooding cathode 406, one or more air distribution membranes and/or air diffusion layers, and/or the like. Those skilled in the art in light of the present disclosure will recognize that numerous alternative components may be utilized in various implementations. For example, some of the components listed above may be eliminated or replaced with alternative components. Likewise, additional components not explicitly listed above may be employed, without departing from the scope of claimed subject matter.

Figure 6:
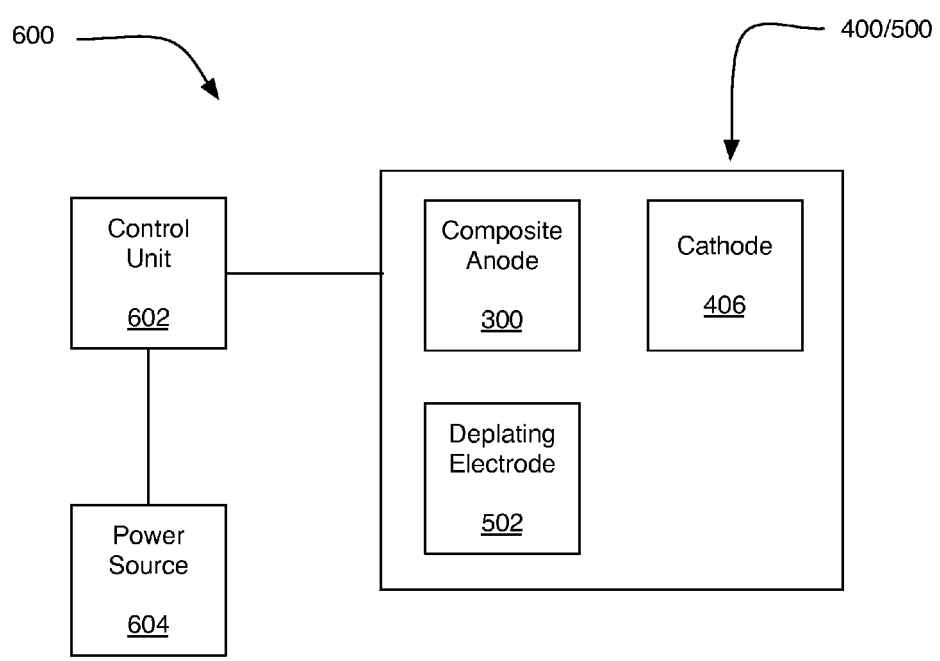
FIG. 6 is an illustration of an example system including a metal air battery, all arranged in accordance with at least some embodiments of the present disclosure.

FIG. 6 is an illustration of an example system 600 including metal air battery 400 and/or metal air battery 500, in accordance with at least some embodiments of the present disclosure. FIG. 6 is provided for purposes of illustration and is not intended to depict structures having exact dimensionalities, shapes etc. nor to depict all components or structures that may be present in some implementations but that have been excluded from FIG. 6 to avoid unnecessarily obscuring claimed subject matter.

System 600 may include a control unit 602 and a power source 604 in addition to metal air battery 400/500. Control unit 602 may control the initiation, duration, and/or cessation of operations of metal air battery 400/500. For example, control unit 602 may control the initiation, duration, and/or cessation of operations of metal air battery 400/500 to remove corrosion resistant coating 310 (see FIG. 3) from composite anode 300. Control unit 602 may include an electrical circuit, hardware, software, firmware, or virtually any combination thereof to implement such control operations.

Control unit 602 may be operably associated with power source 604. Power source 604 may be utilized by control unit 602 to apply a current pulse between composite anode 300 and cathode 406. Additionally or alternatively, Power source 604 may be utilized by control unit 602 to apply a current pulse between composite anode 300 and deplating electrode 502. Power source 604 may include a primary battery, a rechargeable battery, and/or the like. For example, power source 604 may include a low power chemical battery, such as a D-cell battery. In some examples, power source 604 may be capable of delivering currents on the order of a range of about ten milliamps to about ten amps. Such current may be based at least in part on the area of the one or more composite anodes 300 included in metal air battery 400/500.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to inventions containing only one such recitation, even when the same claim includes the introductory phrases one or more or at least one and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to produce a metal air battery, the method comprising:
    forming a corrosion resistant coating on a surface of an anode core to form a first composite anode, the anode core comprising a first metal and the corrosion resistant coating comprising a second metal that is different from the first metal;
    forming a cathode configured to discharge a positive charge from the metal air battery;
    forming a deplating electrode configured to at least partially electropolish the corrosion resistant coating from the first composite anode over two or more stages, wherein an initial portion of the corrosion resistant coating is configured to be removed during initial operation and one or more subsequent portions of the corrosion resistant coating are configured to be removed during one or more subsequent operations;
    providing a battery housing; and
    storing an electrolyte in the battery housing in contact with the cathode, the first composite anode, and the deplating electrode, wherein the electrolyte is configured to precipitate the corrosion resistant coating during electropolishing of the first composite anode.

2. The method of claim 1, wherein the first metal associated with the anode core comprises at least one of aluminum, magnesium, lithium, zinc, and iron.

3. The method of claim 1, wherein the second metal associated with the corrosion resistant coating comprises at least one of nickel, platinum, copper, and zinc.

4. The method of claim 1, wherein the electrolyte includes a precipitation substance comprising at least one of ascorbic acid, succinic acid, and citric acid.

5. The method of claim 4, wherein the first metal associated with the anode core comprises at least one of aluminum, magnesium, lithium, zinc, and iron.

6. The method of claim 4, wherein the second metal associated with the corrosion resistant coating comprises at least one of nickel, platinum, copper, and zinc.

7. The method of claim 1, wherein the first metal associated with the anode core comprises aluminum, and wherein the second metal associated with the corrosion resistant coating comprises nickel.

8. The method of claim 1, wherein the corrosion resistant coating is formed to separate the electrolyte from the surface of the anode core.

9. The method of claim 1, wherein removal of the corrosion resistant coating via the at least partial electropolish by the deplating electrode is to expose at least a part of the surface of the anode core to allow the cathode to discharge the positive charge.

10. The method of claim 1, wherein forming the corrosion resistant coating on the surface of the anode core further comprises applying the corrosion resistant coating to the surface of the anode core by at least one of: immersion, electroless plating, and electroplating.

11. The method of claim 1, wherein forming the resistant coating on the surface of the anode core further comprises applying the corrosion resistant coating to the surface of the anode core to a thickness of about 2.0 µm to 50.0 µm.

12. The method of claim 1, wherein forming the resistant coating on the surface of the anode core further comprises applying the corrosion resistant coating to the surface of the anode core to a thickness of about 2.0 µm to 25.0 µm.

13. The method of claim 1, further comprising applying the corrosion resistant coating to a second anode core surface to form a second composite anode in an array of composite anodes of the metal air battery.

14. The method of claim 13, wherein the first composite anode and the second composite anode are configured to be selectively deplated on an anode-by-anode basis in two or more stages.

15. The method of claim 1, wherein providing the battery housing comprises applying a passive solid on an inner surface of the battery housing.

16. The method of claim 15, wherein the passive solid is configured to bond to a portion of the corrosion resistant coating upon removal by deplating to prevent collection of a removed portion of the corrosion resistant coating on the cathode.

17. The method of claim 15, wherein the passive solid comprises a cross-linked polyanion material.

18. The method of claim 1, wherein the deplating electrode is further configured to collect a removed portion of the corrosion resistant coating.

\* \* \* \* \*